United States Patent [19]

Lee

[11] Patent Number: 5,113,267
[45] Date of Patent: May 12, 1992

[54] APPARATUS FOR AND METHOD OF RECONSTRUCTING A DOCUMENT

[76] Inventor: Aldric K. Lee, 10132 Monroe Dr., Dallas, Tex. 75229

[21] Appl. No.: 434,801

[22] Filed: Nov. 9, 1989

[51] Int. Cl.$^5$ ................................................ H04N 1/40
[52] U.S. Cl. .................................... 358/448; 358/450; 358/406; 358/456
[58] Field of Search .............. 358/473, 456, 459, 458, 358/406, 448, 450

[56] References Cited

U.S. PATENT DOCUMENTS 4,722,008  1/1988  Ibaraki et al. ........................ 358/456
4,933,776  6/1990  Ikeda .................................... 358/456

OTHER PUBLICATIONS

Martin A. Agulnek, Raster Scanner Alignment Technique, vol. 5, No. 3, May/Jun. 1980, 358-406, Xerox disclosure journal.

Primary Examiner—Jin F. Ng
Assistant Examiner—Dov Popovici
Attorney, Agent, or Firm—Harry C. Post, III

[57] ABSTRACT

Apparatus for and method of reconstructing a single document from data provided by scanning apparatus incapable of reading the entire document. A calibration sheet adapted to be disposed on the document to be scanned is used in the reconstructing apparatus. Scanning apparatus for converting a scanned portion of the document and a scanned portion of the calibration sheet into electronic outputs is used in the reconstructing apparatus. A computer processing unit is connected to the scanning apparatus to receive the electronic outputs. The computer processing unit includes storing apparatus for storing a first set of information representing a first scanned portion of the document and calibration sheet, a second set of information representing a second scanned portion of the document and calibration sheet and a third set of information representing a reconstructed single document. Also, the computer processing unit includes a converter for adjusting the first and second sets of stored information relating to the respective portions of the document scanned into alignment and spacing relative to a standard determined by the respective portions of the scanned calibration sheet and for merging the adjusted first and second sets of information to provide the third set of information.

20 Claims, 4 Drawing Sheets

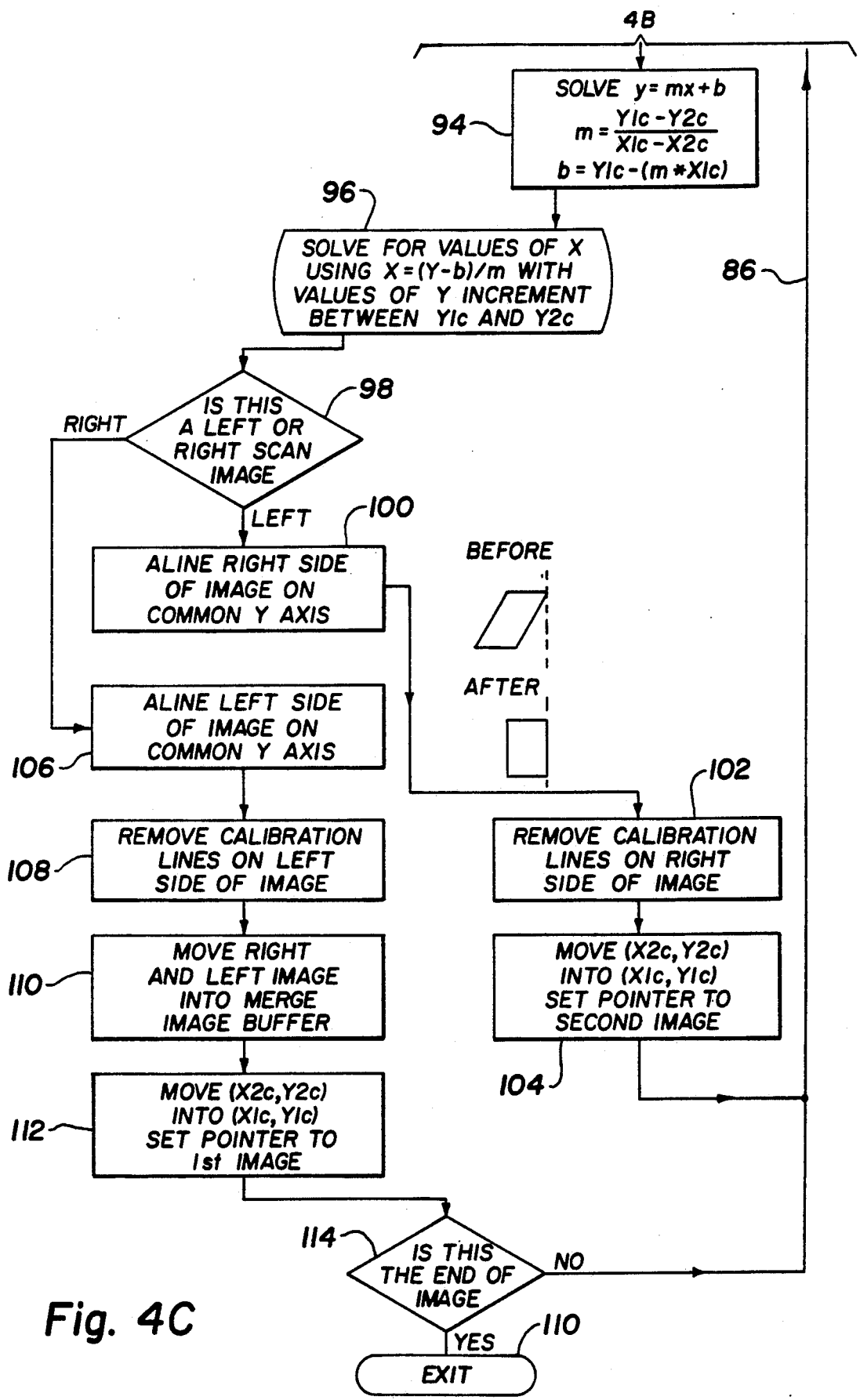

APPARATUS FOR AND METHOD OF RECONSTRUCTING A DOCUMENT

It is well known that a relatively small hand-held scanner used with a computer main processing unit is able to scan only part of the information contained on a document because the hand-held scanner is only about 2.5 to 8 inches in width while the document is normally 8½ by 11 inches and larger. Large document scanners are available to copy such documents, but these large scanners are bulky and expensive, which prevents the average computer user from using such large scanners.

Accordingly, it is an object of the present invention to provide apparatus for and method of reconstructing a single document from data provided by scanning apparatus incapable of reading the entire document.

Further, it has been discovered that when a hand-held scanner is used to convert data printed on a document into machine information, the scanner may be tilted relative to the document resulting in tilted or skewed images relative to one another.

Further, it has been discovered that when a hand-held scanner is used to convert data printed on a document into machine information, the operator may move the scanner relative to the document at different speeds or the measuring roller on the scanner may slip relative to the document thereby creating images that are stretched or compressed relative to one another.

Further, it has been discovered that the size of the image produced by the resulting merged image can be changed without distortion and even enhancement of the image by converting the halftone or dithered image printed on a document into gray scale information stored in the computer main processing unit.

In accordance with the invention, there is provided apparatus for reconstructing a single document from data provided by scanning apparatus incapable of reading the entire document. A calibration sheet adapted to be disposed on the document to be scanned is used in the reconstructing apparatus. Scanning apparatus for converting a scanned portion of the document and a scanned portion of the calibration sheet into electronic outputs is used in the reconstructing apparatus. A computer processing unit is connected to the scanning apparatus to receive the electronic outputs. The computer processing unit includes storing apparatus for storing a first set of information representing a first scanned portion of the document and calibration sheet, a second set of information representing a second scanned portion of the document and calibration sheet and a third set of information representing a reconstructed single document. Also, the computer processing unit includes a converter for adjusting the first and second sets of stored information relating to the respective portions of the document scanned into alignment and spacing relative to a standard determined by the respective portions of the scanned calibration sheet and for merging the adjusted first and second sets of information to provide the third set of information.

Further, in accordance with the present invention, there is provided a method of reconstructing a single document from data provided by scanning apparatus incapable of reading the entire document. A calibration sheet is disposed on the document to be scanned. A first portion of the document and a first portion of the calibration sheet are scanned with a scanning apparatus to provide a first series of outputs through a connection with a computer processing unit. The first series of outputs from the scanning apparatus is stored as a first set of information in the computer processing unit. A second portion of the document and a second portion of the calibration sheet is scanned with the scanning apparatus to provide a second series of outputs through the connection with the computer processing unit. The second series of outputs from the scanning apparatus is stored as a second set of information in the computer processing unit. The first and second sets of stored information relating to the respective portions of the document scanned are adjusted into alignment and spacing relative to a standard determined by the respective portions of the scanned calibration sheet. The adjusted first and second sets of information are merged to provide a third set of information. The third set of information is stored in the computer processing unit.

Further, in accordance with the invention, there is provided apparatus for converting a halftone image to a gray scale image. Scanning apparatus is used to convert a scanned portion of a document into a series of electronic outputs representing a number of lines of pixels. A computer processing unit is connected to the scanning apparatus means for receiving the electronic output. The computer processing unit includes halftone converting device for clustering the pixels into groups, counting the number of pixels in each group and comparing the counted number with a standard and includes storing apparatus for storing the resulting data.

Further, in accordance with the invention, there is provided a method of converting a halftone image to a gray scale image. A portion of a document is scanned. The scanned portion of the document is converted into a series of electronic outputs representing a number of lines of pixels. The electronic outputs are received into a computer processing unit. The outputs representing pixels are clustered into groups. The number of pixels in each group are counted. The counted number is compared with a standard and the resulting data is stored.

Other objects and advantages of the invention will become apparent upon reading the following detailed description and upon reference to the drawings, wherein like reference characters are used throughout to designate like parts:

FIG. 4A-C is a flow chart illustrating the operation of the apparatus shown in FIGS. 1-3.

Figure 1:
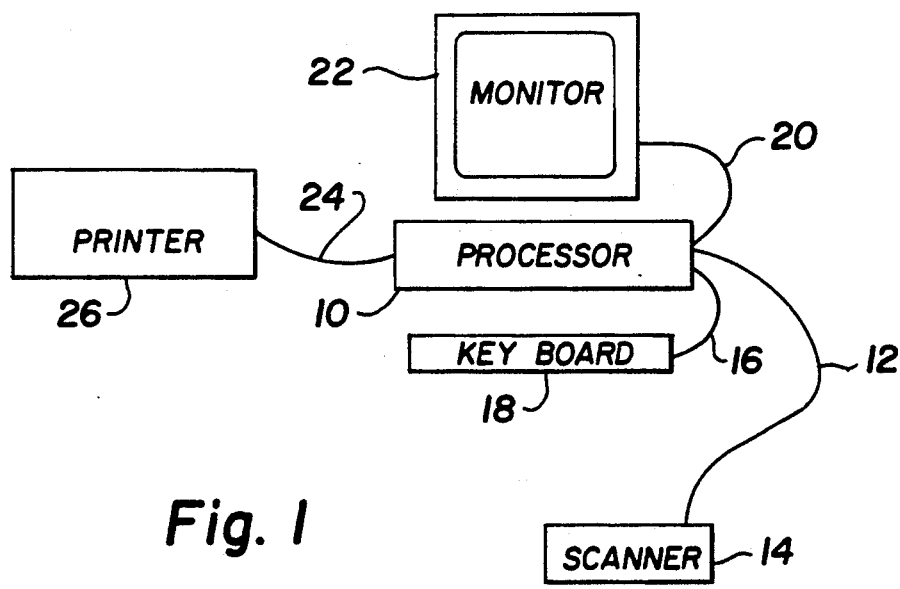
FIG. 1 is a schematic representation of a portion of the apparatus constructed according to the present invention.

Turning now to FIG. 1, there is shown a conventional computer processing unit 10 connected in a conventional manner by conductors 12 to a hand-held scanner 14, by conductors 16 to a conventional keyboard 18, by conductors 20 to a monitor 22, and by conductors 24 to a printer 26. Although any convention apparatus may be connected by the conductors, it is preferred that the computer processing unit be an IBM PC/AT 386 with at least 640K memory, a 20 Megabyte hard drive and a graphics card adapter, that the monitor be a VGA monitor, that the printer be an Hewlett-Packard Laserjet Series II, and that the hand-held scanner is a DFI Handy Scanner 3000 Plus.

Figure 3:
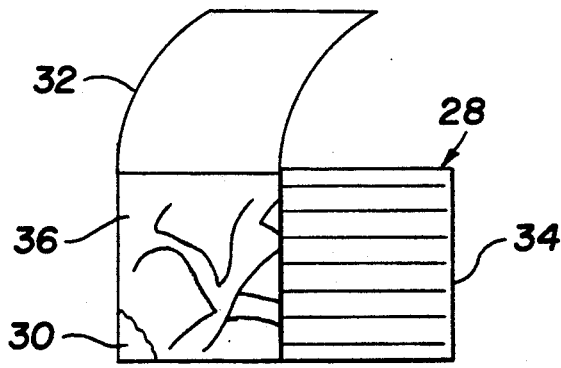
FIG. 3 is another view of the portion of the apparatus constructed according to the present invention shown in FIG. 2.
Figure 2:
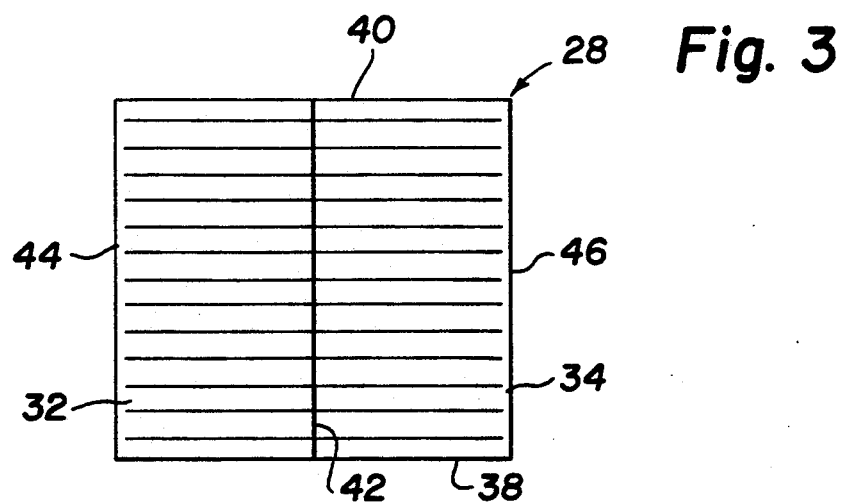
FIG. 2 is a plan view of another portion of the apparatus constructed according to the present invention.

As best seen in FIGS. 2 and 3, there is shown a calibration tablet 28. Calibration tablet 28 is generally of a rectangular shape having a back support 30 and front relatively thin calibration sheets 32 and 34. Document 34 to be scanned by scanner 14 is disposed between back support 30 and calibration sheets 32 and 34.

Calibration sheets 32 and 34 are made from a sheet of flexible material having a plurality of lines disposed to extend parallel to one another and to be an equal distance from one another, which is preferably at least 0.05 inches, and more preferably about 0.06 inches. It has been found that the lines provided on the calibration sheets work best when each such line has a thickness equal to the distance between the lines.

It is preferred that each calibration sheet have a rectangular shape with the plurality of lines extending substantially parallel to the shorter side of the rectangular shape. Sheets 32 and 34 may be totally separate sheets or made from a single sheet of flexible material that is substantially bisected by cutting from shorter edges 38 along a line 42 extending generally parallel to and equidistant between the longer edges 44 and 46 of the rectangular shape to a location in close proximity to the other shorter side 40.

Before scanning begins, document 36 is disposed between back 30 and front calibration sheets 32 and 34 with the image to be scanned facing in the same direction as the lines on calibration sheets 32 and 34. Calibration sheet 34 is flipped away from document 36 and scanner 14 used to scan side one of the image to produce (IMAGE 1) along with a portion of the calibration lines. Calibration sheet 32, as shown in FIG. 3, is then flipped away from document 36 and scanner 14 used to scan side two of the image to produce (IMAGE 2) along with another portion of the calibration lines. The calibration lines act as reference points for correcting image distortions such as tilted, compressed, or stretched images and the reference points help to provide the information needed to correct for these distortions. Further, the calibration lines are used to locate common points on the image being scanned to help determine where IMAGE 1 and IMAGE 2 will be joined together.

It is necessary for each image (IMAGE 1 and IMAGE 2) to be enhanced because of the associated problems of stretched or compressed images, tilted or skewed images and halftone or dithered images caused during the scanning operation.

In stretched or compressed images, the dots per inch ratio varies between IMAGE 1 and IMAGE 2 or even different parts of the same image. Since the different parts of the images will not align, the images will not merge together. When the calibration lines are scanned, there is an expected number of pixels between each calibration line. If there are too few, the image has been compressed and, if there are too many, the image has been stretched. By duplicating or removing pixels, the image can be scaled to the proper number of pixels per inch.

When IMAGE 1 and IMAGE 2 are scanned at slight angles relative to one another, the images are tilted or skewed relative to one another. The calibration lines are used so that each horizontal bar indicates how much the image needs to be shifted or rotated back to make up for the tilt or skew.

In halftone or dithered images, actually one bit, black and white scans, filtered to create a dither pattern so as to simulating shades of gray within the computer with groupings of black dots suggesting different densities. Unfortunately, once a dithered image is created, there no longer remains any ability to alter the image, such as adjusting size, scaling it up or down, or printing it at another resolution, without destroying or greatly distorting the image with leftover or missing pixels. For greater control, the halftone or dithered image needs to be converted into a gray scale image so that if problems such as stretching, shrinking, or shifting occur, the image can be corrected.

IMAGE 1 and IMAGE 2 are basically described in a two dimensional array of pixels where each pixel is located by an X and Y coordinate. Coordinate (0,0) is the upper left corner and (Xmax, Ymax) is the lower right coordinate. Each pixel has an intensity value. For example, 0 may indicate black, 8 may represent a mid gray level and 16 may indicate white. If the halftone image is modified through scaling, shifting or rotation, the halftone pattern will become distorted due to strips or patterns caused by the removing or adding of lines from the halftone. To solve this problem, it is necessary for the halftone to be converted to gray scale. This is done by clustering each of the halftone patterns and then counting the number of pixels that are light or dark. This number represents the gray scale value for that cluster. For example, a 4 by 4 halftone pattern would have 17 possible gray levels because there are 16 pixels. If 4 out of the 16 pixels were black, then the gray scale value would be 4. Through the use of gray scale and the X and Y coordinate system, the image can be mathematically manipulated to correct the image.

Figure 4A:
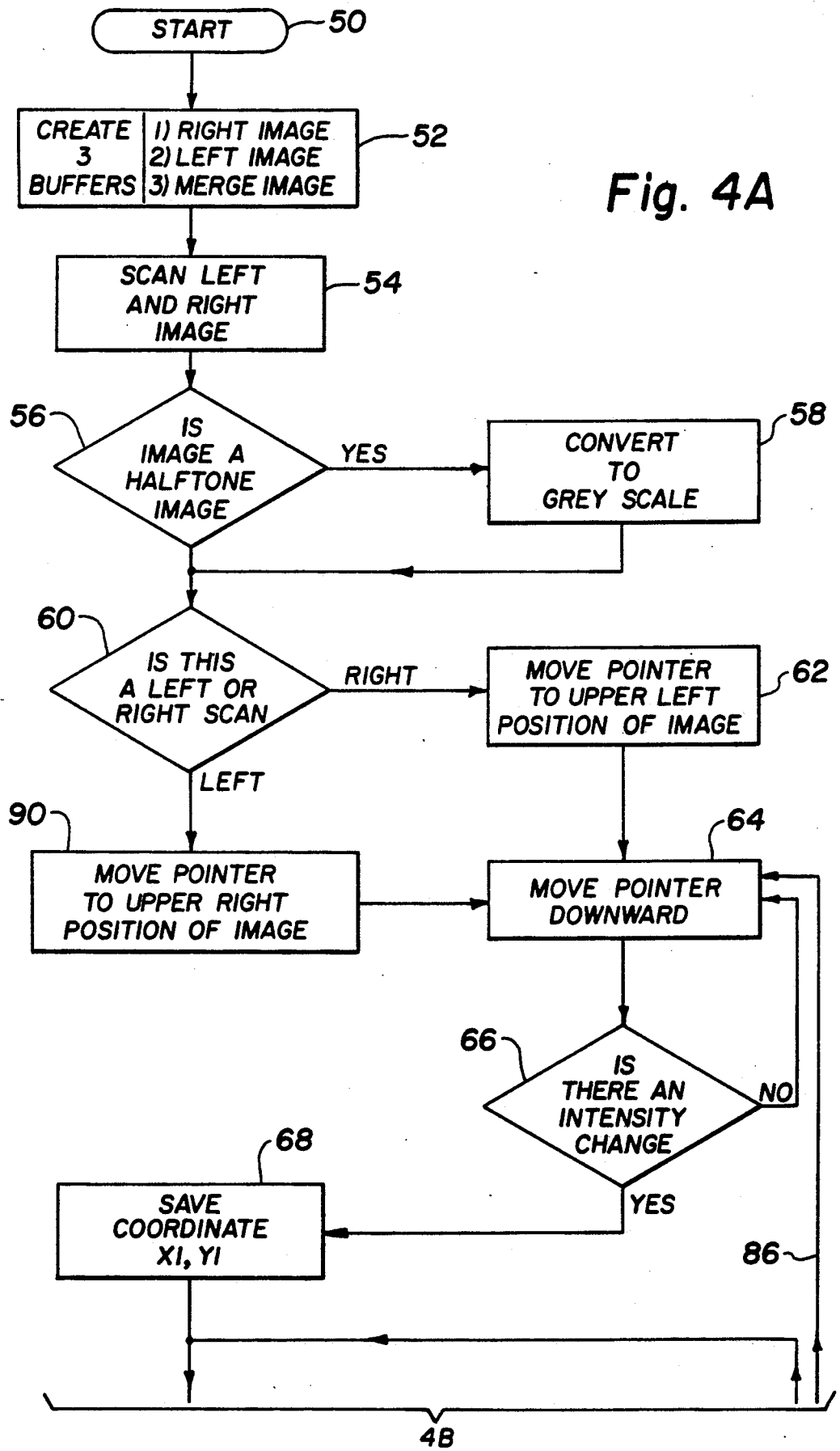
Figure 4B:
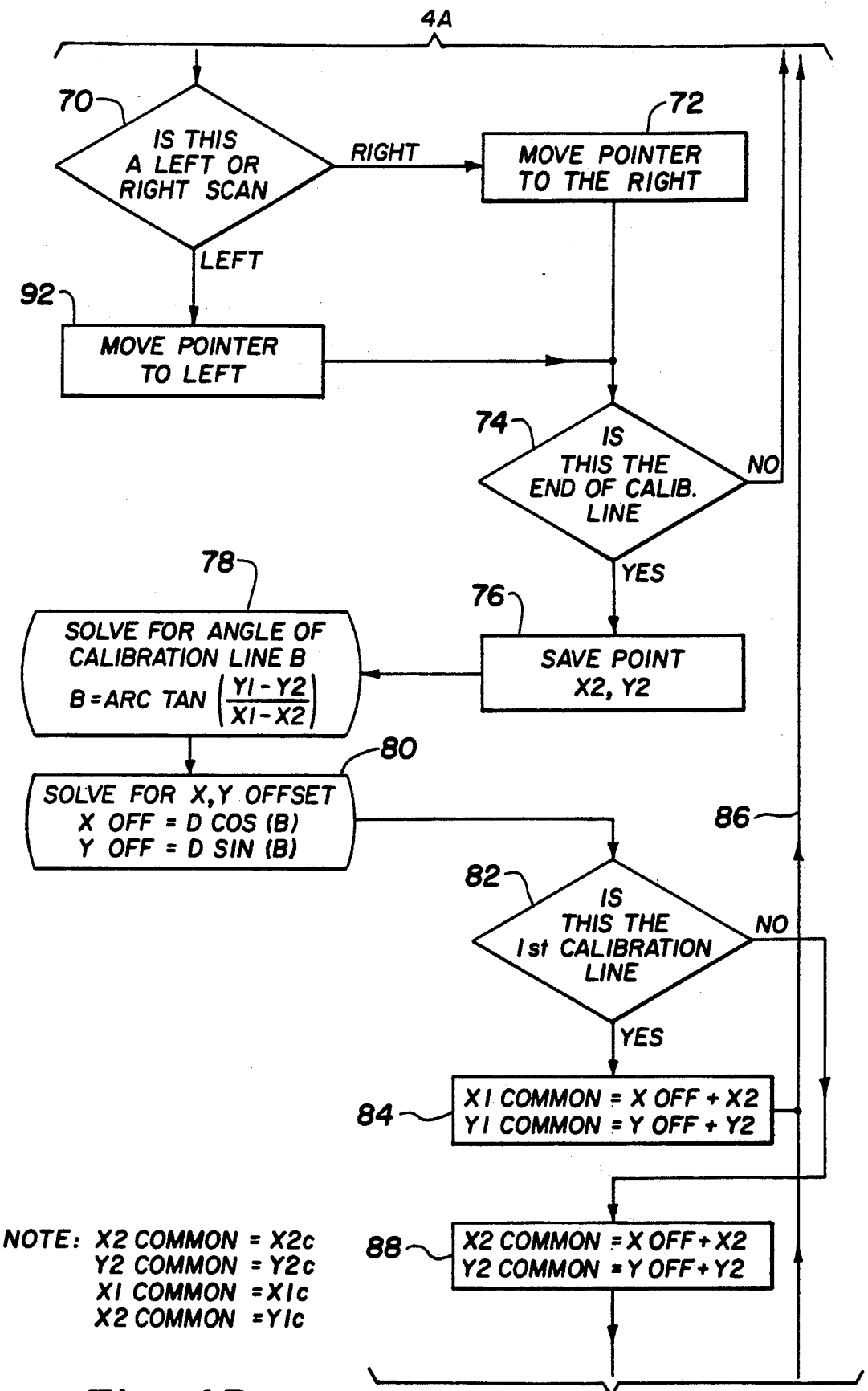

As best seen in FIGS. 4A–C, the operation of the apparatus shown in FIGS. 1-3 is illustrated as a flow chart. The operation begins with start 50 by processor 10 creating three buffers as represented in flow chart box 52. The first buffer is for storing the information transmitted through conductors 12 from scanner 14 for the right image when calibration sheet 32 is flipped back to allow access to the right hand side of document 36. The second buffer is for storing the information transmitted through conductors 12 from scanner 14 for the left image when calibration sheet 32 is flipped back to allow access to the left hand side of document 36. The third buffer is for storing the information created when the first and second stored information is adjusted, aligned and merged to provide information that forms the reconstructed image.

Following the creation of three buffers as represented by box 52, the left hand side of document 36 and a portion of calibration sheet 34 are scanned by scanner 14, as represented by box 54 of the flow chart, with the data stored in the second buffer and then the right hand side of document 36 and a portion of calibration sheet 32 are scanned by scanner 14, as represented by box 54 of the flow chart, with the data stored in the first buffer.

After both sides of the image on document 36 are scanned, processing unit 10 decides 56 whether or not the image is a halftone image, shown in box 56. If the image is a halftone image, then the data contained in the respective buffer one or two is converted to gray scale, as represented by box 58, as previously described.

After the data is converted to gray scale or is received as gray scale, the data is determined to be obtained from a left or right scan, as shown in box 60. If the data is from a right scan, then the first calibration line on calibration sheet 34 is located. This location, as shown in box 62, is obtained by beginning from a fixed starting position and moving down the Y coordinate while sampling the intensity level, as shown in box 66. If there is no change in intensity, then no data is processed. If there is a sudden change in intensity, then the location of the first calibration line is indicated and saved as first reference point X1,Y1, as shown in box 68.

Once the calibration line has been located, a search begins to locate the end of the calibration line. The search again requires a determination, as shown in box 70, as to whether or not the scan is left or right. Again, if the data is from a right scan, then the end of first calibration line on calibration sheet 34 is located. This location, as shown in box 72, is obtained by incrementing the X coordinate and checks the intensity of the surrounding pixels for any changes. This incrementing process continues, as shown in box 74, until the end of the calibration line is encountered, at which time the location of the second reference point X2,Y2 is saved, as shown in box 76.

After the first and second reference points have been determined, the angle B of the calibration line is calculated, as shown in box 78, with the following formula:

$$B = \arctan(Y1 - Y2)/(X1 - X2) \qquad \text{I.}$$

If desired, the column of lines on calibration sheet 34 is offset from the image by a fixed distance "D". The common points between the two scanned images must be adjusted for this offset. The X and Y offsets are determined, as shown in box 80, with the following formulas:

$$X\text{off} = D\cos B \qquad \text{II.}$$

$$Y\text{off} = D\sin B \qquad \text{III.}$$

Since these calculations are based on the first calibration, as shown in box 82, the common point coordinates (Xcommon, Ycommon) are located by adding Xoff and Yoff to the second reference point X2,Y2, as shown in box 84, as indicated in the following formulas:

$$X1\text{common} = X\text{off} + X2 \qquad \text{IV.}$$

$$Y1\text{common} = Y\text{off} + Y2 \qquad \text{V.}$$

As indicated by flow line 86, after the first common point is determined, the search continues downward along the Y coordinate seeking sudden changes in intensity with the X1,Y1 being the starting reference point on which to reference the second horizontal calibration line and with X1',Y1' being the location of the second horizontal calibration line. At which time, X2common and Y2common being determined as previously described, as shown in box 88, with the following formulas:

$$X2\text{common} = X\text{off} + X2 \qquad \text{VI.}$$

$$Y2\text{common} = Y\text{off} + Y2 \qquad \text{VII.}$$

Since the distance between the first and second calibration lines is known, the number of vertical pixels is determined. Thus, if the number of expected lines does not match the actual number, extra lines of pixels may be added or removed to correct for image distortion.

In the event the scan is determined to be a left scan at box 60, then the first calibration line on calibration sheet 32 is located. This location, as shown in box 90, is obtained by beginning from a fixed starting position and moving down the Y coordinate while sampling the intensity level, as shown in box 66. If there is no change in intensity, then no data is processed. If there is a sudden change in intensity, then the location of the first calibration line is indicated and saved as first reference point X1,Y1, as shown in box 68.

Once the calibration line has been located, a search begins to locate the end of the calibration line. The search again requires a determination, as shown in box 70, as to whether or not the scan is left or right. If the data is from a left scan, then the end of first calibration line on calibration sheet 34 is located. This location, as shown in box 92, is obtained by incrementing the X coordinate and checks the intensity of the surrounding pixels for any changes. This incrementing process continues, as shown in box 74, until the end of the calibration line is encountered, at which time the location of the second reference point X2,Y2 is saved, as shown in box 76.

The steps remaining to determine the common points are as previously described with respect to the right scan.

Once the first and second common points (X1',Y1' and X2',Y2', respectively) are determined, all points between are approximated by using the following equation:

$$Y = mX + b \qquad \text{VIII.}$$

where m is the slope of the line and b is the Y intercept, as shown in box 94. If Xc1,Yc1 is the first common point and Xc2,Yc2 is the second common point, then the slope can be found by using the following equations:

$$m = (Yc1 - Yc2)/(Xc1 - Xc2) \qquad \text{IX.}$$

$$b = Yc1 - (m * Xc1) \qquad \text{X.}$$

As shown in box 96, the individual points located between the two common points are calculated by incrementing between X1 and X2 and using the formula set forth at VIII.

If a left scan image is being processed, as shown in box 98, then the right side of the image is aligned on a common Y axis as shown in box 100 (the alignment being shown in the sketch of before and after to the right of box 100). The calibration lines on the right side of the image are removed as shown in box 102 and the search begins for the next common point in the left image, as shown in box 104, proceeding through flow line 86 back to box 64.

If a right scan image is being processed, as shown in box 98, then the left side of the image is aligned on the common Y axis, as shown in box 106 and the calibration lines on the left side of the image are removed as shown in box 108. The right image is then merged with the left image and stored in the merge image buffer, as shown in box 110, and the search begins for the next common point in the right image, as shown in box 112.

After the image has been completely merged, as shown in box 114, the process ends at box 116.

The invention having been described, what is claimed is:

1. Apparatus for reconstructing a single document from data provided by scanning apparatus incapable of reading the entire document, comprising: a calibration sheet adapted to be disposed on the document to be scanned; scanning apparatus means for converting a scanned portion of the document and a scanned portion of the calibration sheet into electronic outputs; and a computer processing unit connected to said scanning apparatus means to receive the electronic outputs, said computer processing unit including storing means for storing a first set of information representing a first scanned portion of the document and calibration sheet, a second set of information representing a second scanned portion of the document and calibration sheet and a third set of information representing a reconstructed single document, and converting means for adjusting the first and second sets of stored information relating to the respective portions of the document scanned into alignment and spacing relative to a standard determined by the respective portions of the scanned calibration sheet and for merging the adjusted first and second sets of information to provide the third set of information.

2. Apparatus as set forth in claim 1, further comprising: said scanning apparatus means including means for providing an output signal composed of a number of lines of pixels; and said computer processing unit further including halftone converting means for clustering the pixels into groups, counting the number of pixels in each group and comparing the number with a standard to convert the halftone pattern of the document being scanned into gray scale.

3. Apparatus as set forth in claim 2, further comprising: said computer processing unit means further including the standard number being based on the square of the lines of pixels transmitted as a unit by said scanning apparatus means.

4. Apparatus as set forth in claim 1, further comprising: said calibration sheet further including a sheet of flexible material having a plurality of lines disposed to extend parallel to one another and to be an equal distance from one another.

5. Apparatus as set forth in claim 4, further comprising: said calibration sheet further including each of the plurality of lines on the sheet of flexible material having a thickness equal to the distance between the lines.

6. Apparatus as set forth in claim 4, further comprising: said calibration sheet further including the sheet of flexible material having a rectangular shape with the plurality of lines extending substantially parallel to the shorter side of the rectangular shape, and the sheet of flexible material being substantially bisected by cutting from one of the shorter edges along a line extending generally parallel to and equidistant between the longer edges of the rectangular shape to a location in close proximity to the other shorter side.

7. Apparatus as set forth in claim 1, further comprising: the converting means of said computer processing unit means further including determining means for determining from the stored information relating to the portion of scanned calibration sheet in each of the first and second sets of stored information a series of common points disposed at predetermined locations between the first and second portions of the document, the common points forming a seam along which the first and second portions of the scanned document are adjusted and merged.

8. Apparatus as set forth in claim 7, further comprising: the converting means of said computer processing unit means further including correlating means for selectively expanding and contracting the stored information relating to the portion of scanned document in each of the first and second sets of stored information to fit between the respective series of common points.

9. Apparatus as set forth in claim 8, further comprising: said scanning apparatus means including means for providing an output signal composed of a number of lines of pixels; and said computer processing unit means further including halftone converting means for clustering the pixels into groups, counting the number of pixels in each group and comparing the number with a standard to convert the halftone pattern of the document being scanned into gray scale, and the converting means of said computer processing unit means further including scaling means for selectively adding or subtracting numbers of pixels in the gray scale to selectively expanding and contracting the information stored in the first and second sets of information when being stored as the third set of information.

10. A method of reconstructing a single document from data provided by scanning apparatus incapable of reading the entire document, comprising the steps of: disposing a calibration sheet on the document to be scanned; scanning a first portion of the document and a first portion of the calibration sheet with a scanning apparatus to provide a first series of outputs through a connection with a computer processing unit; storing the first series of outputs from the scanning apparatus as a first set of information in the computer processing unit; scanning a second portion of the document and a second portion of the calibration sheet with the scanning apparatus to provide a second series of outputs through the connection with the computer processing unit; storing the second series of outputs from the scanning apparatus as a second set of information in the computer processing unit; adjusting the first and second sets of stored information relating to the respective portions of the document scanned into alignment and spacing relative to a standard determined by the respective portions of the scanned calibration sheet; merging the adjusted first and second sets of information to provide a third set of information; and storing the third set of information in the computer processing unit.

11. The method as set forth in claim 10, further comprising the steps of: providing an output signal from the scanning apparatus composed of a number of lines of pixels; clustering the pixels into groups; counting the number of pixels in each group; and comparing the number of pixels counted with a standard to convert the halftone pattern produced by scanning the document into a gray scale.

12. The method as set forth in claim 11, further comprising the step of: the standard number being based on the square of the lines of pixels transmitted as a unit by the scanning apparatus.

13. The method as set forth in claim 10, further comprising the step of: providing the calibration sheet with a sheet of flexible material having a plurality of lines disposed to extend parallel to one another and to be an equal distance from one another.

14. The method as set forth in claim 13, further comprising the step of: providing the calibration sheet with each line having a thickness equal to the distance between the lines.

15. The method as set forth in claim 13, further comprising the steps of: providing the flexible material of the calibration sheet with a rectangular shape, the plurality of lines extending substantially parallel to the shorter side of the rectangular shape, and the sheet of flexible material being substantially bisected by cutting from one of the shorter edges along a line extending generally parallel to and equidistant between the longer edges of the rectangular shape to a location in close proximity to the other shorter side.

16. The method as set forth in claim 10, further comprising the steps of: determining from the stored information relating to the portion of scanned calibration sheet in each of the first and second sets of stored information a series of common points disposed at predetermined locations between the first and second portions of the document; and forming a seam of the common points along which the first and second portions of the scanned document are adjusted and merged.

17. The method as set forth in claim 16, further comprising the step of: selectively expanding and contracting the first and second sets of stored information relative to one another to fit between the respective series of common points.

18. The method as set forth in claim 17, further comprising the steps of: providing an output signal from the scanning apparatus composed of a number of lines of pixels; clustering the pixels into groups; counting the number of pixels in each group; comparing the number of pixels counted with a standard to convert the halftone pattern produced by scanning the document into a gray scale; and selectively adding and subtracting lines of pixels with the information converted to gray scale to selectively expand and contract the information being stored as the third set of information.

19. Apparatus for converting a halftone image to a gray scale image, comprising: scanning apparatus means for converting a scanned portion of a document into a series of electronic outputs representing a number of lines of pixels; a computer processing unit connected to said scanning apparatus means for receiving the electronic output, said computer processing unit including halftone converting means for clustering the pixels into groups, counting the number of pixels in each group and comparing the counted number with a standard number, the standard number being based on square of the number of lines of pixels to be transmitted as a unit by said scanning apparatus means, and storing means for storing resulting data.

20. A method of converting a halftone image to a gray scale image, comprising the steps of: scanning a portion of a document; converting the scanned portion of the document into a series of electronic outputs representing a number of lines of pixels; receiving the electronic outputs into a computer processing unit; clustering the electronic outputs representing pixels into groups; counting the number of pixels in each group; comparing the counted number with a standard number; basing the standard number of square of the number of lines of pixels to be received as a unit by the computer processing unit; and storing resulting data.

* * * * *